United States Patent [19]
Weibel

[11] Patent Number: 6,164,574
[45] Date of Patent: Dec. 26, 2000

[54] MILL, IN PARTICULAR FOR PEPPER OR SALT

[75] Inventor: Hans Weibel, Schupfen, Switzerland

[73] Assignee: Zyliss Haushaltwaren AG, Lyss, Switzerland

[21] Appl. No.: 09/404,728

[22] Filed: Sep. 24, 1999

[30] Foreign Application Priority Data

Oct. 5, 1998 [CH] Switzerland ............................ 2021/98

[51] Int. Cl.⁷ .................................................. A47J 42/04
[52] U.S. Cl. ......................................... 241/168; 241/169.1
[58] Field of Search ................................ 241/168, 169.1, 241/100, DIG. 27; 222/142.1–142.9

[56] References Cited

U.S. PATENT DOCUMENTS

| | | | |
|---|---|---|---|
| 210,837 | 12/1878 | Chalas | 241/169.1 |
| 2,782,998 | 2/1957 | Hastings, Jr. | 241/169.1 |
| 4,685,627 | 8/1987 | Lee | 241/169.1 |
| 4,771,955 | 9/1988 | Paulson | 241/169.1 |
| 4,865,258 | 9/1989 | Smith et al. | 241/169.1 |
| 5,785,264 | 7/1998 | Yang | 241/169.1 |
| 5,897,067 | 4/1999 | Tardif et al. | 241/169.1 |

*Primary Examiner*—John M. Husar
*Attorney, Agent, or Firm*—Oblon, Spivak, McClelland, Maier & Neustadt, P.C.

[57] ABSTRACT

A mill for grinding material such as salt grains or pepper corns whose coarseness can be adjusted and whose grinding gear can be disassembled for cleaning. The mill has a middle part which serves as a reservoir for the material to be ground and an upper part which is attachable to the middle part by means of an attachment and adjustment element. In addition, the mill has a lower part which is designed to unscrew from the middle part for the purpose of cleaning the grinding gear. The grinding gear includes both an upper grinding wheel which is disposed underneath on the middle part and a lower grinding wheel which is screwed together with the attachment and adjustment element through a pivot pin. The pivot pin is connected in a nonrotatable way to the upper part. The grinding gear is actuated by turning the upper part. Using the attachment and adjustment element, the distance between the two grinding wheels and thus the degree of coarseness of grinding can be adjusted. Thereby, simple cleaning of the grinding gear and very fine grinding of the material to be ground are made possible.

11 Claims, 7 Drawing Sheets

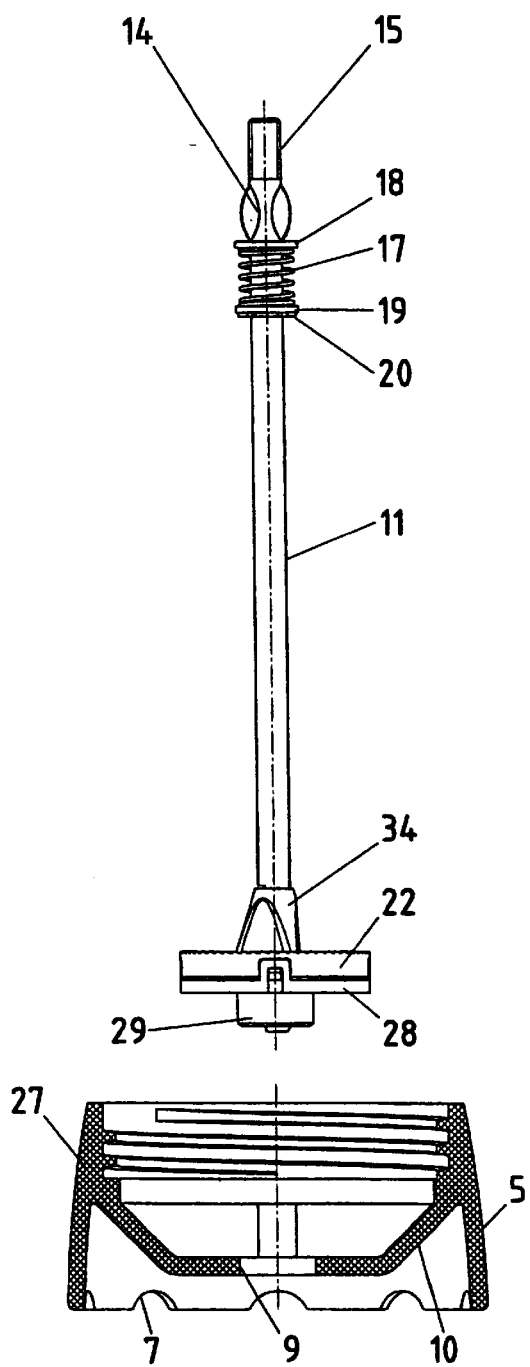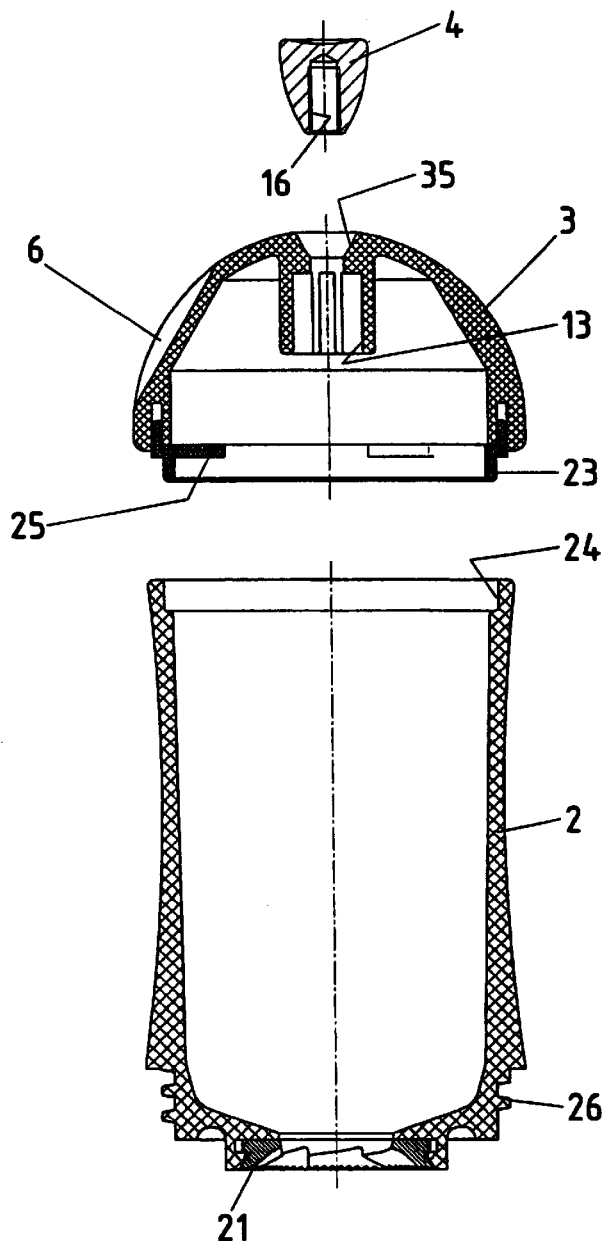
FIG. 5 FIG. 6

MILL, IN PARTICULAR FOR PEPPER OR SALT

CROSS REFERENCE TO RELATED APPLICATION

This application claims priority under 35 USC §119 to Switzerland patent application 2021/98 filed Oct. 5, 1998, the entire contents of which is incorporated herein by reference.

BACKGROUND OF THE INVENTION

1. Field of the Invention

The present invention relates to a mill for grinding salt or pepper.

2. Discussion of the Background

Known salt or pepper mills have the disadvantage that grinding gear in the mills cannot be easily cleaned. Moreover it is not possible to produce ground material which is ground finely enough.

SUMMARY OF THE INVENTION

Accordingly, one object of this invention is to provide a novel salt or pepper mill which avoids the disadvantages of the state of the art and creates a mill in which the grinding gear is easy to clean and a finely ground material can be produced. In addition, the present invention adjusts the degree of coarseness of grinding. These objects are achieved by means of the invention through an attachment and adjustment element. The attachment and adjustment element attaches the upper part through the middle part to a lower part. The lower part is removably attached to or detachable from the middle part. The attachment and adjustment element adjusts the degree of coarseness of grinding, whereby an upper grinding wheel is disposed below on the middle part and a lower grinding wheel is pivotably disposed on the lower part. The lower part is detachably connected to the attachment and adjustment element via a connecting element.

Another object of this invention is to provide the mill with grinding wheels made of ceramic materials.

Another object of this invention is to provide the mill with upper and lower grinding wheels of identical design.

A further object of this invention is to provide in the mill a grinding wheel with grinding teeth in an edge region of the grinding wheel and with a disposed incline extending from the grinding teeth to a central aperture. The disposed incline transports pepper corns or salt grains from a reservoir in the middle part to the grinding teeth.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 5 is an exploded view of the lower part of the mill and a perspective view of the lower ceramic grinding wheel with a connecting element designed as a pivot pin;

FIG. 6 is an exploded view of a section through parts of the mill;

DESCRIPTION OF THE PREFERRED EMBODIMENT

Figure 1:
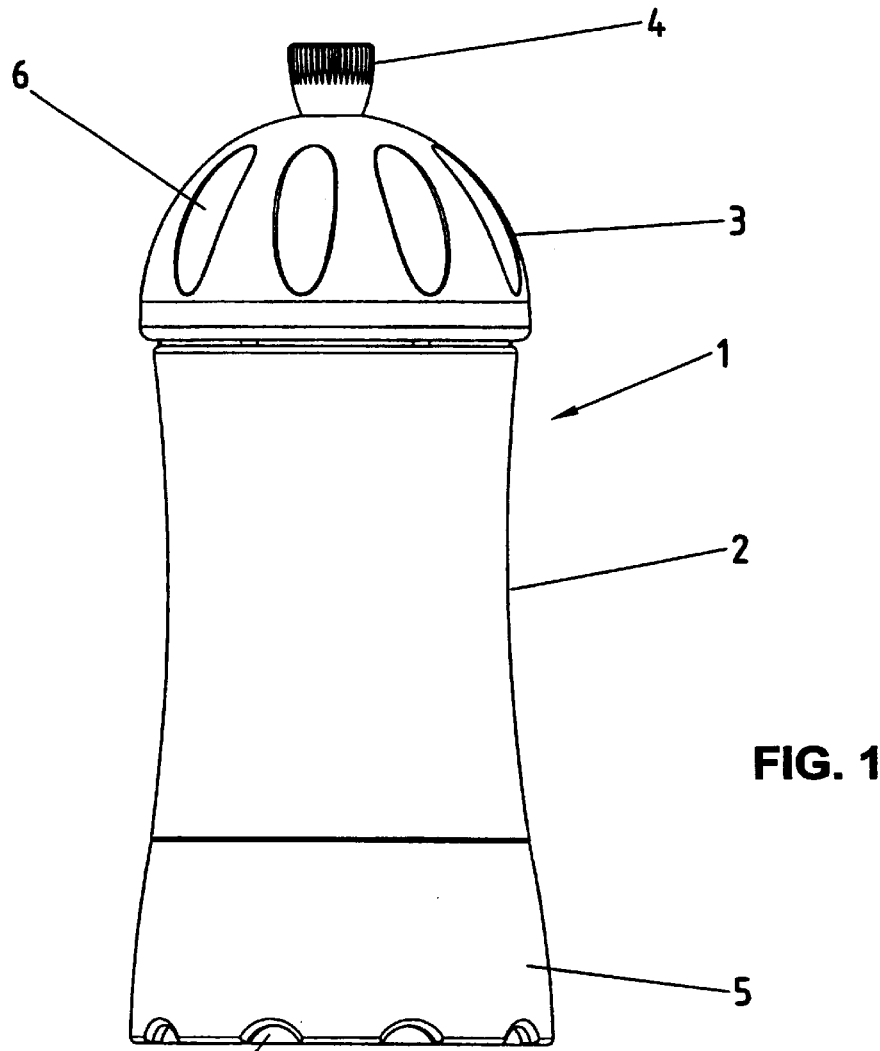
FIG. 1 is a perspective side view of the mill of the present invention.

Referring now to the drawings, wherein like reference numerals designate identical or corresponding parts throughout the several views, and more particularly to FIG. 1 thereof, FIG. 1 is a perspective side view of the mill of the present invention. The mill comprises a middle part 2 which is preferably designed transparent and which serves as the reservoir for the pepper corns or respectively the salt grains. In addition, an upper pivotable part 3 is provided which serves to actuate a lower grinding wheel 22, not visible in this figure. The upper part 3 is designed as a cap. An actuation knob 4 of metal serves to fix the upper part 3 to the middle part 2 and a lower part 5. The actuation knob 4 serves to adjust the coarseness of grinding. The lower part 5 is fastened to the middle part 2 in a way so as to be removable by unscrewing, permitting cleaning of the grinding gear. The tipper part 3 is provided with indentations 6 which facilitate a better hold on the upper part 3 when grinding. The lower part 5 is provided with notches 7 on its lower end.

Figure 2:
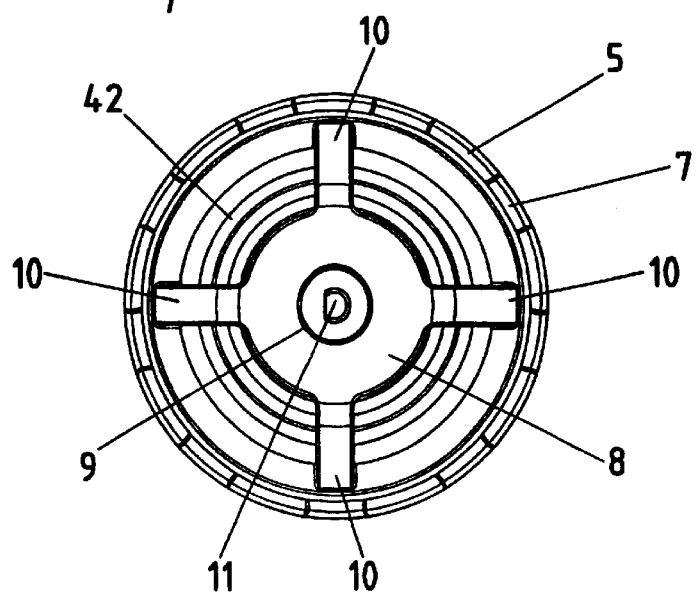
FIG. 2 is a perspective view from below of the mill.

FIG. 2 is a perspective view from below of the mill. A circular disk 8, with a circular aperture 9, is fastened to the lower part by means of four ribs 10 disposed at right angles to one another. Also visible in FIG. 2 is a pivot pin 11 for actuating the grinding gear. The pivot pin 11 serves as a connecting element between the upper part 3 and the lower grinding wheel 22. The circular aperture 9 serves as a bearing for a lower grinding wheel. Ground material can emerge through an opening 42 between the ribs 10.

Figure 3:
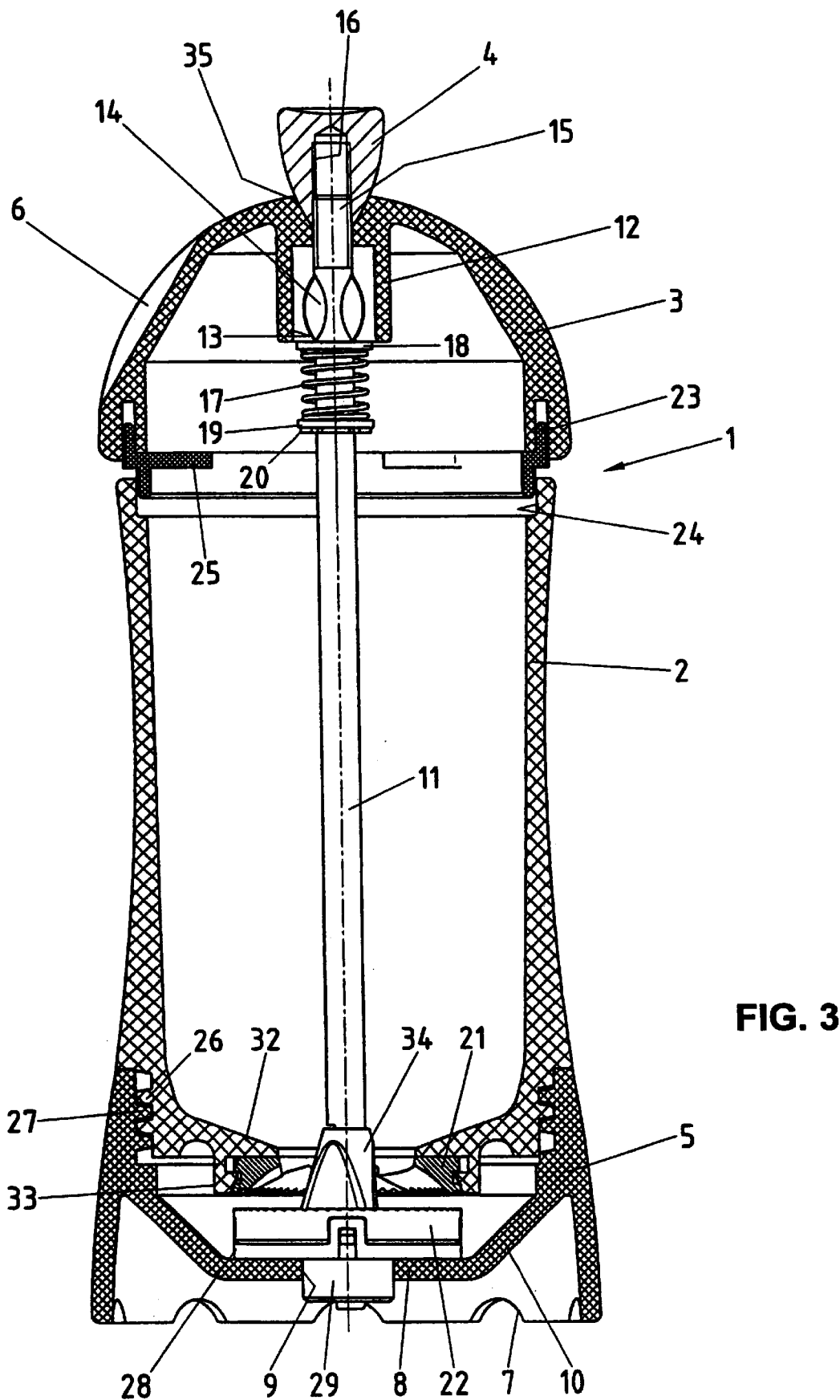
FIG. 3 is a view of a longitudinal section through the entire mill.

FIG. 3 is a view of a longitudinal section through the entire mill 1. The upper part 3 is provided in its middle region with a downwardly protruding projection 12 with an opening 13 for holding two engaging pieces 14 mounted on the pivot pin 11. The upper end of the pivot pin 11 is provided with an outer threading 15, which screws into an inner threading 16 of the actuation knob 4. A spring 17 is held, capable of being squeezed together, between two disks 18 and 19, the lower disk 19 being fastened firmly to the pivot pin 11 with a clamping ring 20. The upper disk 18 can slide (i.e. can be displaced) along the pivot pin 11 and is pressed against the protruding projection 12. Ensured by means of the spring 17 is a secure adjustment of the grinding coarseness through changing the distance between an upper grinding wheel 21 and the lower grinding wheel 22.

The upper grinding wheel 21 and the lower grinding wheel 22 are made of ceramic and form the grinding gear 21, 22.

The grinding gear is actuated by means of the upper part 3. Provided on the lower portion of the upper part 3 is a projection 23, which is introduced into a groove 24 in the upper portion of the middle part 2. Provided on the projection, for manufacturing reasons, are three tabs 25 protruding at right angles therefrom. The middle part is provided as shown in FIG. 3 with an outer threading 26, into which screws an inner threading 27 of the lower part 5. The lower grinding wheel 22 is held on a plastic mounting 28, which is provided with a hollow cylindrical extension 29 designed integral therewith. Together with the extension 29, the plastic mounting 28 is held in the circular aperture 9 such that the plastic mounting 28 and the extension 29 can be rotated. The lower grinding wheel 22 is pressed into the plastic mounting 28. The lower grinding wheel 22 attached to the plastic mounting 28 is thus rotatably supported. The upper grinding wheel 21 is pressed into a horizontal projection 32 and into a vertical projection 33 at the bottom of the middle part. The plastic mounting 28 is fixed to the pivot pin 11 with an upwardly protruding conical extension 34. Besides fixing the pivot pin, the conical part 34 has the function of guiding the pepper corns or salt grains into the outer region of the grinding wheels.

Figure 4:
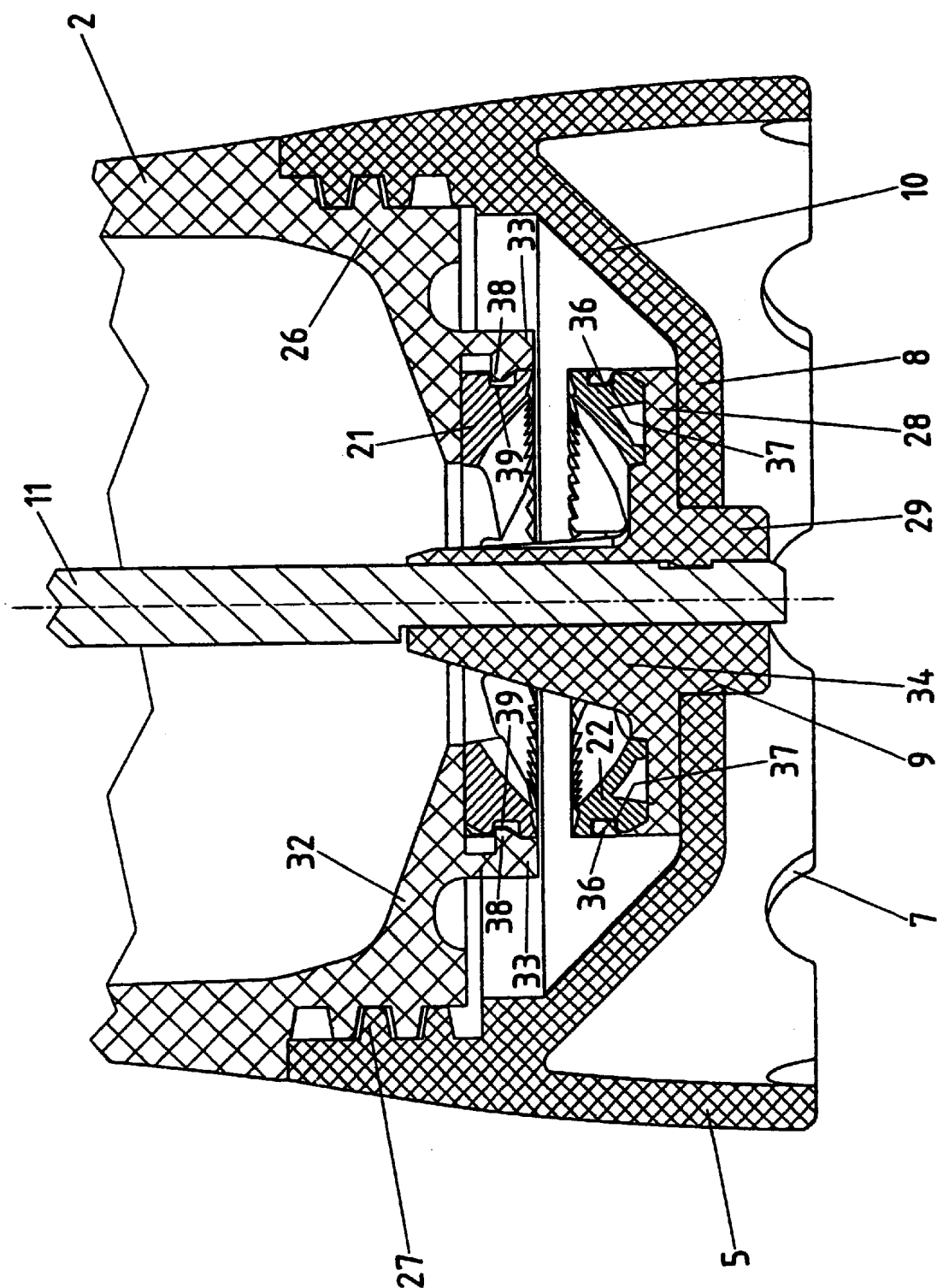
FIG. 4 is a cross-sectional view through the lower part and partially through the middle part of the mill as assembled.

Shown in FIG. 4, on a scale larger than in FIG. 3, is a cross-sectional view through the lower region of the pepper mill and also through the lower grinding wheel. Visible in this figure are inwardly projecting protrusions 36 provided on the plastic mounting 28. The protrusions engage in recesses 37 of the lower ceramic grinding wheel 22. Provided on the vertical projection 33 of the middle part 2 are, likewise, inwardly projecting protrusions 38 which engage in recesses 39 of the upper ceramic grinding wheel 21.

FIG. 5 is an exploded view of the lower part 5 of the pepper or salt mill and a perspective view of the connecting element or pivot pin 11 designed to pivot with the lower grinding wheel 22 fixed to the lower end of the pivot pin 11.

FIG. 6 is an exploded view of a section through the middle part 2, the tipper part 3 and the actuation knob 4 of the salt or pepper mill. The upper grinding wheel 21 is fixed on the underside of the middle part 2.

Figure 7:
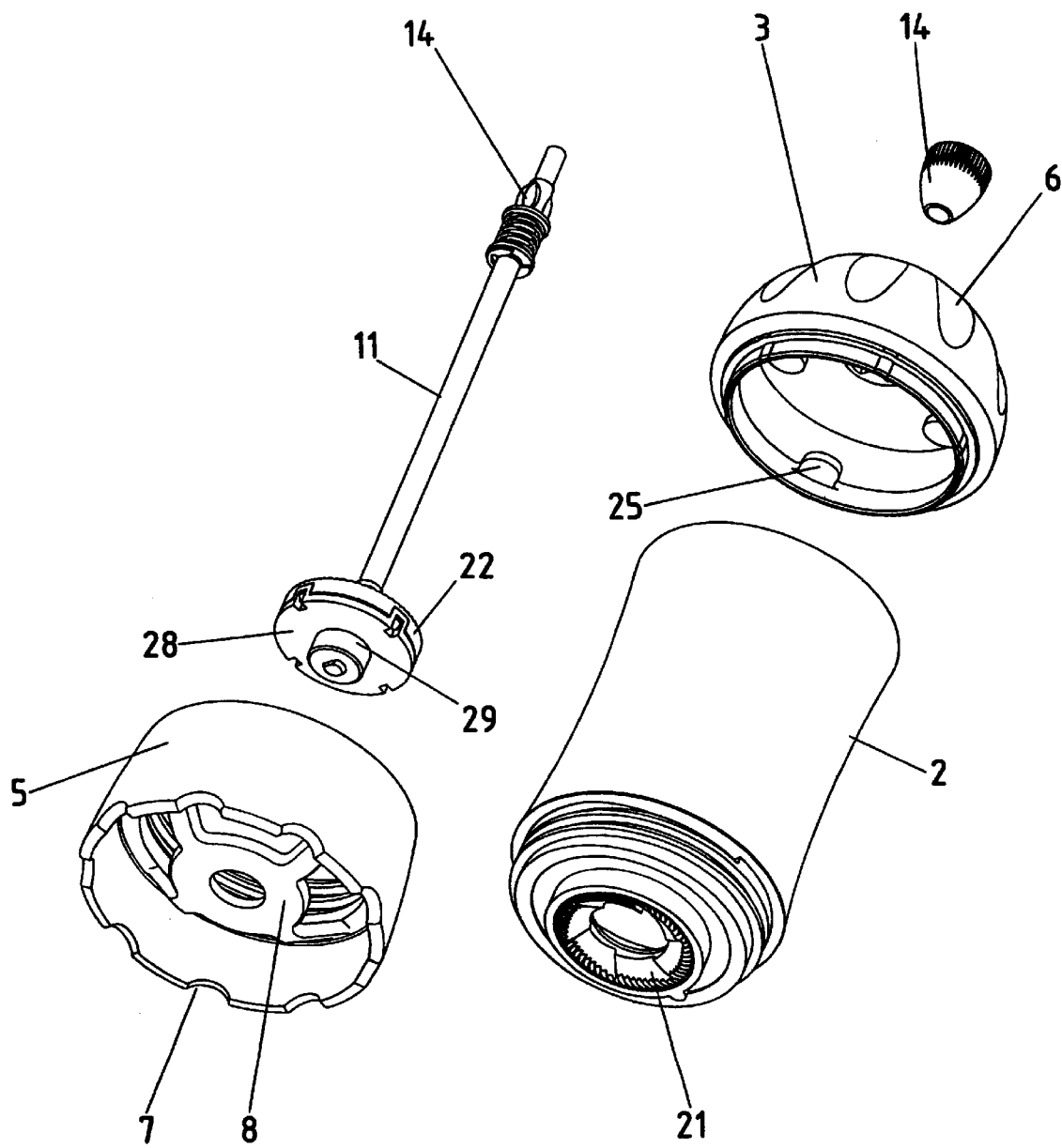
FIG. 7 is a perspective view of all parts of the mill.

FIG. 7 is a perspective view of all the parts of the pepper or salt mill.

Figure 8:
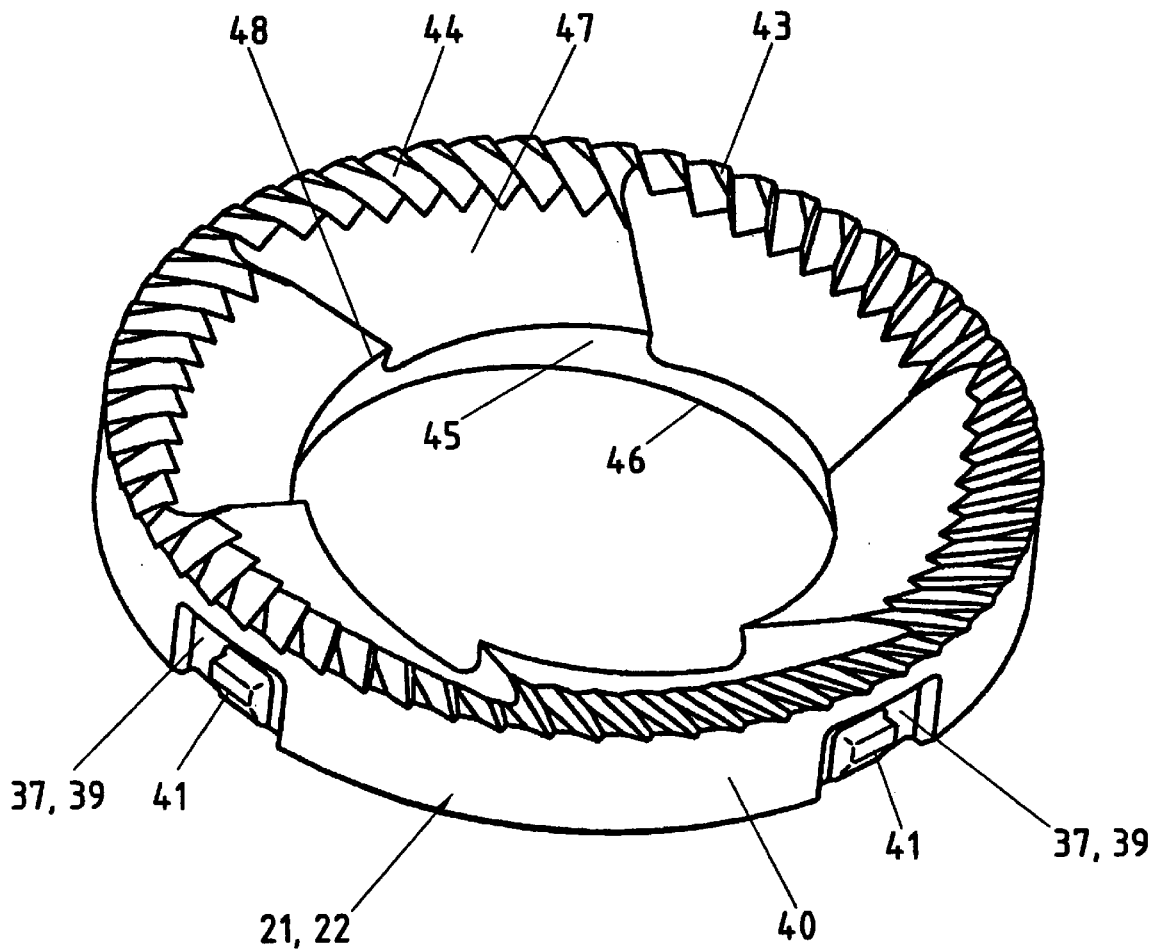
FIG. 8 is a perspective view of one of the ceramic grinding wheels of identical circular design.

FIG. 8 is a perspective view of one of the ceramic grinding wheels of identical circular design. Provided on an outer rim 40 of the grinding wheels are four projections 41 disposed at regular intervals. The protrusions 36 and 38 on the plastic molding 28 and the vertical projection 33, respectively, engage in the depressions 37 and 39 on the lower and upper grinding wheels, respectively, and form a snap closure. Disposed on the upper outer edge 43 of one of the two identical grinding wheels 21, 22 are grinding teeth 44. Extending inwardly from the grinding teeth in the direction toward a circular opening 45 and disposed concentrically with respect to the upper outer edge 43 of the grinding wheel are surfaces 47 inclined toward an underside 46 of the grinding wheel. Slanting surfaces 47 are provided with edges 48 extending from the grinding teeth 44 to the circular opening 45. By means of the slanting surfaces 47 and the edges 48, the pepper corns or salt grains are led away from the center of the grinding wheel toward the grinding teeth 44.

Figure 9:
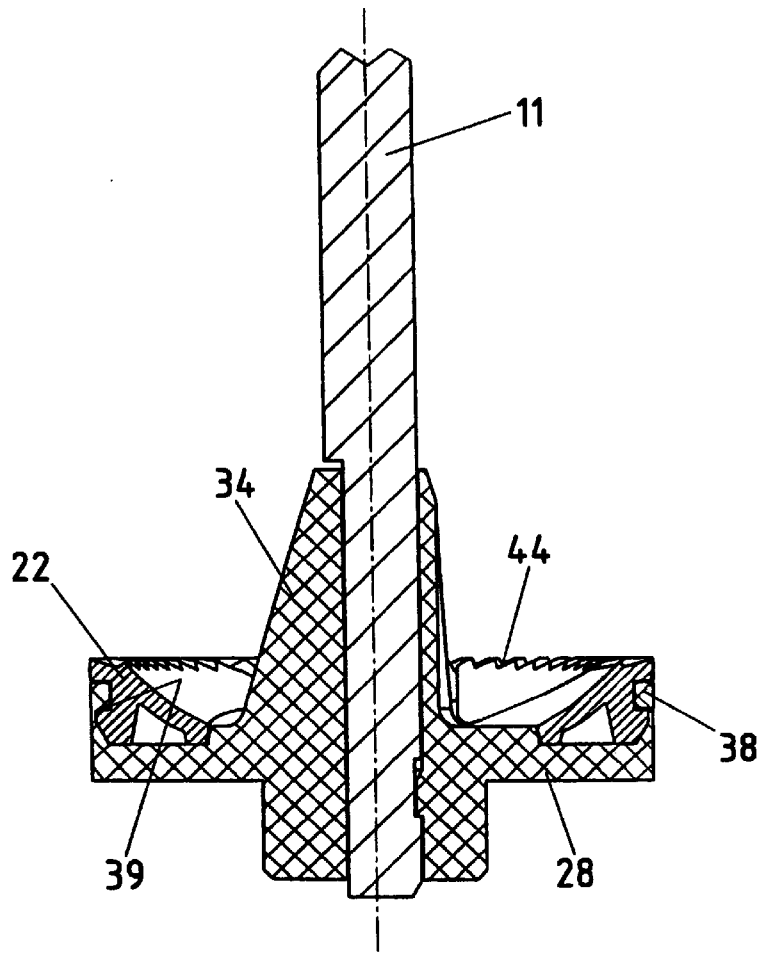
FIG. 9 is a cross-sectional view through the lower grinding wheel with pivot pin.

FIG. 9 is a cross-sectional view through the lower part of the pivot pin 11 and the plastic mounting 28 with the lower grinding wheel 22 fixed thereon.

Figure 10:
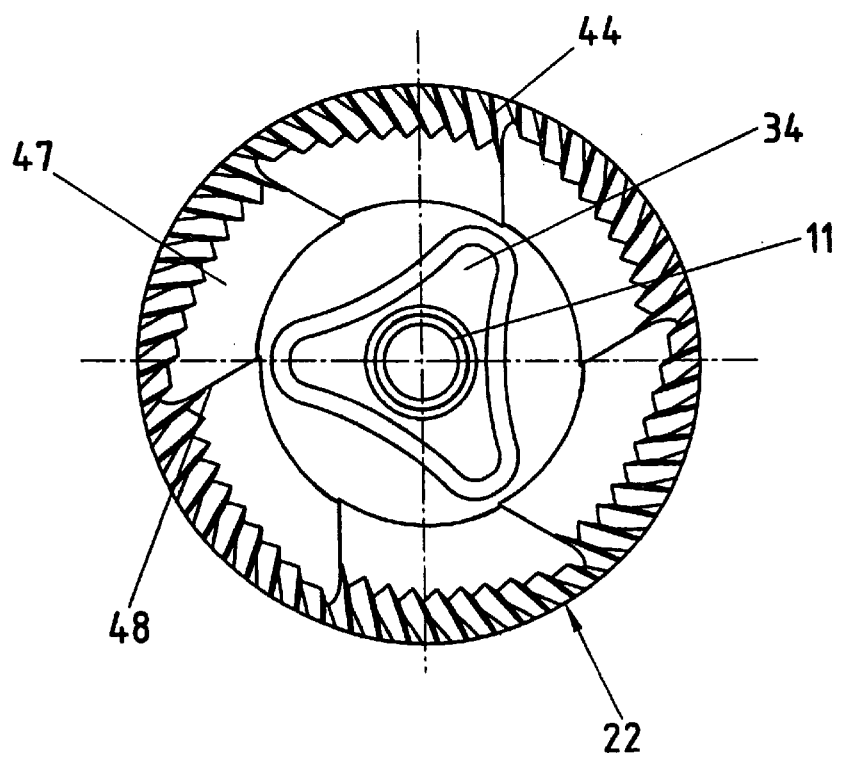
FIG. 10 is a top view of the lower grinding wheel.

FIG. 10 is a top view of the lower grinding wheel 22 mounted on the pivot pin 11.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters patents of the United States is:

1. A mill with a grinding gear for grinding material, comprising:

a middle part containing a reservoir configured to receive the material to be ground;

an upper part detachable from the middle part and configured to actuate the grinding gear;

an attachment and adjustment element connected to the upper part and configured to adjust the coarseness of grinding;

an upper grinding wheel as part of the grinding gear, disposed underneath the middle part; and a lower part detachable from the middle part, containing as another part of the grinding gear a lower grinding wheel configured to grind the material from the reservoir against the upper grinding wheel, wherein said lower grinding wheel is rotatably supported and is detachable from the attachment and adjustment element via a connecting element, and wherein the grinding gear is accessible when the lower part is detached from the middle part so as to facilitate cleaning of the grinding gear.

2. The mill of claim 1, wherein the reservoir contains salt.

3. The mill of claim 1, wherein the reservoir contains pepper.

4. The mill of claim 1, wherein:

the middle part is provided with an outer threading at the bottom; and the lower part is provided with an inner threading at the top to connect middle and upper parts.

5. The mill of claim 1, wherein said connecting element comprises a pivot pin with an outer threading at the top of said pivot pin, said outer threading being configured to screw into an inner threading of said attachment and adjustment element.

6. The mill of claim 1, wherein said connecting element includes a spring disposed on an upper region of the connecting element between a first disk connected to said connecting element and a second disk displaceable on said connecting element, to provide a secure adjustment for the coarseness of grind.

7. The mill of claim 1, wherein the rotatable support for said lower grinding wheel comprises:

a disk-shaped part with a downwardly protruding hollow-cylindrical extension for bearing in an aperture of a second disk connected to said lower part; and an upwardly protruding conical extension fastened to the connecting element.

8. The mill of claim 1, wherein the Lipper and lower grinding wheels are made from a ceramic material.

9. The mill of claim 1, wherein the upper and lower grinding wheels have an identical circular design.

10. The mill of claim 1, wherein the upper and lower grinding wheels have teeth in an outside edge region of said grinding wheels.

11. The mill of claim 10, wherein the upper and lower grinding wheels have, in a region extending from the teeth to a central aperture inside the grinding wheel, slanting surfaces disposed inclined toward the underside of the grinding wheel with edges located on the slanted surfaces configured to transport the pepper corns or salt grains from the reservoir to the teeth.

* * * * *